2,992,279
Patented July 11, 1961

2,992,279
1-IODO, 2-TRIFLUOROMETHYL PERFLUORO-CYCLOALKANES
Robert Neville Haszeldine, Cambridge, England (Windyridge, Lyme Road, Disley, Cheshire, England)
No Drawing. Filed Aug. 28, 1956, Ser. No. 606,578
Claims priority, application Great Britain Sept. 14, 1955
6 Claims. (Cl. 260—648)

This invention is concerned with polyfluorinated cycloaliphatic compounds and derivatives thereof.

Organic fluorine compounds are becoming of increasing industrial importance. They have been used in making elastomers, refrigerants, oils, greases, and waxes which have great resistance to high temperatures and to attack by solvents. In certain cases they form the basis for surface active compounds of improved stability. The use of organic fluorine compounds has been limited, however, by the difficulty and expense of their preparation. To overcome these drawbacks, much effort has been spent in developing compounds which would be relatively easy to prepare and which could either be used directly for the purposes indicated above, or transformed easily into a variety of other compounds useful for these purposes.

It has now been found that fluorine containing bromo and iodo compounds can be added to certain cyclic olefins and substituted cyclic olefins to give new fluorine compounds directly useful, inter alia, as fungicides, propellants, refrigerants, lubricants, and hydraulic fluids; or as intermediates in the preparation of other compounds for these purposes.

In accordance with the invention, the new compounds are prepared by reacting a fluoroiodoalkane or a fluorobromo alkane with the olefin or substituted olefin as indicated in the general reaction:

(1) 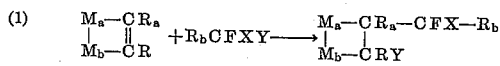

where $M_a$ and $M_b$ are $-CRR_c-$ or $-CRR_c-CRR_c-$, where R and $R_c$ are hydrogen, chlorine, fluorine, alkyl, or halogenoalkyl, where $R_a$ is hydrogen, fluorine or alkyl, and where at least one of R, $R_a$ and $R_c$ contains a fluorine atom; where $R_b$ is hydrogen, chlorine, fluorine, bromine, alkyl, or halogenoalkyl, where Y is bromine or iodine; where when Y is iodine, X is fluorine, chlorine, bromine, hydrogen, alkyl, or halogenoalkyl, and where when Y is bromine, X is chlorine or bromine.

Two typical reactions of this type are:

(2) 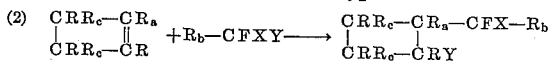

(3) 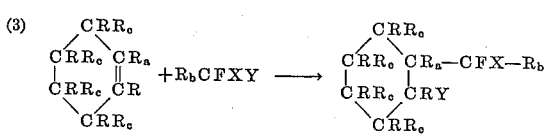

These reactions are of special interest because the addition of bromo or iodo alkanes and substitute alkanes to cyclic unsaturated compounds, where the alkane carbon atom to which the iodine is attached carries one or more fluorine atoms, has not previously been observed. It is particularly surprising that the reactions indicated may be carried out even where the cyclic compound and the addition group $R_bCFX-$ are a perfluoro compound and group, respectively.

As a by-product from Reaction 3, which it may be noted proceeds less readily than Reaction 2, there may be formed a compound of the formula (a) 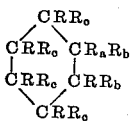

This by-product (a) is noteworthy in that the addition of two polyfluoroalkyl groups to a double bond has until now not been observed.

Examples of suitable cyclic olefins and substituted cyclic olefins for use in the novel process are:

(b) 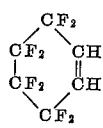

3,3,4,4,5,5,6,6-octafluoro cyclohexene-1

(c) 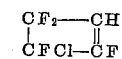

1,3,3,4-tetrafluoro-4-chlorocyclobutene-1

(d) 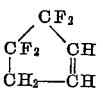

3,3,4,4,-tetrafluoro-cyclopentene-1

(e) 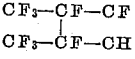

2,3,4,-trifluoro-3,4-perfluoromethylcyclobutene-1

(f) 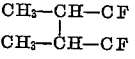

1,2,-difluoro,3,4-dimethyl-cyclobutene-1

(g) 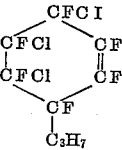

1,2,3,4,5,6,hexafluoro-3,4,5-trichloro-6-perfluoropropyl-hexene-1

Among the halogeno alkanes which can be used in the novel process, the following may be cited as examples:

(h) $CF_3I$     (n) $C_3F_7CH_2CF_2I$
(i) $CHF_2I$     (o) $CF_2ClBr$
(j) $C_3F_7I$     (p) $CF_3CF_2ClBr$
(k) $CH_3CF_2I$     (q) $CF_2Br_2$
(l) $CF_2ClI$     (r) $C_3F_7CHFCFBr_2$
(m) $CF_2ClCFClI$     (s) $CF_2ClCFClBr$

The Reaction 1 is carried out under conditions conducive to free radical formation. Such conditions may include the use of ultra-violet light, heat, a chemical initiator, a radioactive initiator or a combination of these agencies.

When ultra-violet radiation is used, the temperature of the reaction is not critical and may range, for example, from room temperature to about 300° C., or even higher.

When heat alone is used as the initiating agent, the temperature of the reactants should be above about 70° C. Preferably the reaction is carried out at between about 150° C. and about 300° C. Higher temperature may be used in certain cases, if desired.

When an initiator is used, the reaction should be conducted at a temperature such that the initiator will form free radicals. This temperature may be room temperature or even lower, but is usually between about 60° C. and about 150° C. When an initiator is used, the particular compound chosen is one which will form free radicals under the conditions of the reaction and which is compatible with the reactants and the products of the reaction. Examples of suitable initiators are the peroxide compounds, such for example, as benzoyl peroxide, hexafluoroacetyl peroxide, and di-ter-butyl peroxide. Other compounds, such as the azo compounds, for example, $\alpha,\alpha'$-azo-di-isobutyronitrile and the diazo compounds, such as diazomethane, are also suitable.

Pressure is not considered a critical factor in inducing the reaction, but super-atmospheric pressures, for example pressures up to 20 atmospheres or even higher are desirable as increasing the reaction rate.

Preferably a stoichiometric excess of $R_bCFXY$ is used in the reaction. The exact proportions will vary with the particular compound, but up to 20 times the stoichiometric equivalent of the bromo or iodo compound may be used.

The time of reaction is not critical and is determined by the reactants and the other reaction conditions. It may vary from a day to three weeks.

The two new classes of bromo- or iodo-compounds provided by this invention undergo a series of reactions to give a number of derivatives many of which are new per se.

In the first place, when the new compound is an iodo compound, the iodine atom may in certain cases be replaced by chlorine or bromine. This reaction is possible when the ring substituents are fluorine, polyfluoro alkyl, or to a limited extent, chlorine, and may be written:

(4) 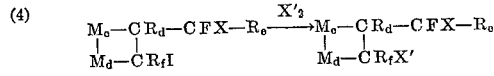

where $M_c$ and $M_d$ are —$CR_fR_g$— or —$CR_fR_g$—$CR_fR_g$— and are the same or different, where $R_d$ is fluorine or chlorine, where $R_e$, $R_f$, and $R_g$ are fluorine or polyfluoroalkyl, where $X'$ is chlorine or bromine, and where $X$ is as defined above.

The halogen replacement reaction just described may be carried out under the influence of any agency which will cause free radical formation. It may, for example, be carried out under ultra-violet light at room temperature, or any other convenient temperature. Preferably, however, it is carried out by simply applying heat, without ultra-violet radiation. In carrying out the replacement reaction, the compound to be reacted is subjected to the action of elemental chlorine or bromine at a temperature sufficient to cause the chlorine or bromine to attack iodine in the compound or to cause free radicals produced from the compound to attack chlorine or bromine. Such temperatures will vary with the particular compound. Room temperature may be suitable. Generally, however, a temperature in excess of 50° C. will be necessary.

The pressure is not critical and the reaction may be performed in either the liquid, solid, or gaseous phase. The reaction time is also not critical and is simply that necessary to replace all of the iodine.

The iodo compounds used as starting materials in Equation 4 and also certain of their bromine analogs may be coupled, in the manner and under the conditions described in my copending applications, S.N. 377,716, now abandoned, and 526,087. Application S.N. 526,087 has been replaced by continuation-in-part applications, S.N. 680,914 and 680,915 and is now abandoned.

Both the starting iodo-compound and the bromo- or chloro- products of Reaction 4 may be reduced to replace iodie, bromine, or chlorine, as the case may be, with hydrogen. This reduction may be accomplished in various ways, but is conveniently carried out using lithium aluminium hydride, a suitable medium for the reaction being ether or dioxan. This reaction is as follows:

(5) 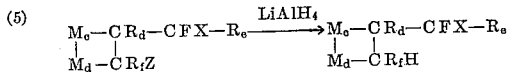

where Z represents iodine, bromine or chlorine, and $M_c$, $M_d$, $R_d$, $R_e$, and $R_f$ are as defined above. In the case where Z represents bromine or chlorine, the product of Reaction 5 may be reconverted to its precursor by bromination or chlorination, as the case may be.

The temperature of the reaction is governed by the reaction medium being used, and is usually below the boiling point of the medium. Pressure is not critical and may be atmospheric or higher. Reaction time is dependent on the reactants and the other reaction conditions. It generally will be on the order of five to six hours. Preferably an excess of hydride, for example from one to three times the stoichiometric amount, is employed.

Certain of the reduced hydrogen containing compounds produced by Reaction 5 may be subjected to dehydrohalogenation, to produce a polyfluorocycloolefin. This reaction may be written:

(6) 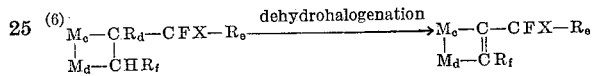

where $M_c$, $M_d$, $X$, $R_d$, $R_e$, and $R_f$ are as defined above.

Reaction 6 is only possible where the carbon atom to which the —$CFX$—$R_e$— group is attached also bears a fluorine or a chlorine atom. It may be carried out in conventional manner using alcoholic KOH or NaOH, as described for example in Haszeldine, "Journal of the Chemical Society," 676 3371–3378 (1953).

The polyfluorocycloolefins produced by Reaction 6 may be converted to their dichloride or dibromides by reactions with chlorine or bromine. This reaction may be written as follows:

(7) 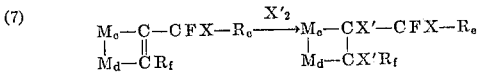

where $M_c$, $M_d$, $R_e$, $R_f$ and $X'$ are as defined above.

Reaction 7 is carried out in conventional manner, under conditions normally used to add halogen to olefinic linkages.

The olefinic compounds obtained from Reaction 6 may also be oxidized to form a variety of products, depending on the particular compound being oxidized.

When the compound is of the general formula

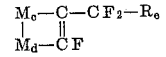

the following reactions occur:

(8) 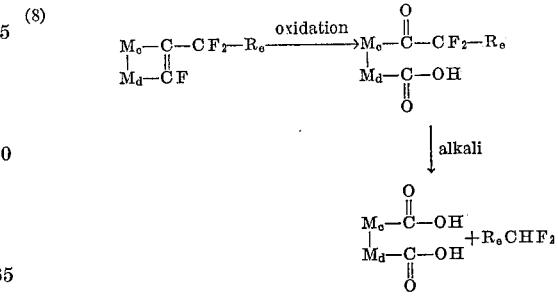

where $M_c$, $M_d$, and $R_e$ are as defined above.

Reaction 8 is carried out using a suitable oxidizing agent, such for example as potassium permanganate or potassium dichromate in an alkaline or neutral medium or ozone. The reaction is preferably carried out at a slightly elevated temperature, for example at 30° to 100° C., but may be carried out at room temperature, or even below room temperature. Pressure is not critical and may be atmospheric. Reaction time is simply whatever is necessary to complete the particular oxidation and is usually of the order of one to several hours.

When the initial compound does not correspond to the formula

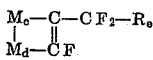

but has the general formula

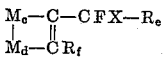

the products which result from oxidation will depend on the particular compounds being used. Examples of individual products are compounds such as $HM_c$—$M_dCOOH$, $HM_c$—$M_dH$ and $R_e$—$CFX$—$CO$—$M_c$—$M_d$—$COR_f$, where $M_c$, $M_d$, $R_e$, $R_f$, and $X$ are as defined above.

The products of Reactions 1 to 8 inclusive are all new chemical compounds useful, inter alia, as intermediates in the synthesis of fluorinated organic compounds, which in turn may be used, for example, for the manufacture of elastomers, oils, greases, waxes and refrigerants.

The invention is illustrated by the examples which follow, it being understood that the examples are given for the purpose of illustration and are not to be taken as in any way restricting the invention beyond the scope of the appended claims. The reactions described in the examples were carried out in sealed Pyrex or silica tubes unless otherwise stated. Precautions were taken to exclude air, moisture, or material which might catalyse free-radical reactions. The olefins used were spectroscopically pure and free from peroxides, and were distilled in vacuo before use. Reaction products were manipulated in conventional vacuum system.

*Example I*

(a) Perfluorocyclobutene (3.6 g.) and trifluoroiodomethane (100 % excess) in a 50 ml. silica tube, exposed to ultra-violet light (25 days), gave unchanged olefin (30%) and the new compound 1-iodo-2-trifluoromethylhexafluorocyclobutane (67% based on olefin used) B.P. 85°–87° C. (Found: C, 17.0%; M, 360. $C_5IF_9$ requires C, 16.8%; M, 358). The high density of the new compound makes it useful in float instruments and manometers. It is also useful for flotation separation of solids, particularly where an inert material is required. Further, it has fungicidal properties. Spectoscopic examination of the recovered olefin showed it to be identical with the starting product.

(b) 1-iodo-2-trifluoromethylhexafluorocyclobutane (5.9 g.) in dioxan (10 ml.) was added slowly (2 hours) to a vigorously stirred suspension of lithium aluminum hydride (2 g.) in dioxan (50 ml.). After being stirred for a further hour the mixture was heated to 60° C. (1 hour) and then cooled. Dilute sulphuric acid (30 ml.) was added slowly, then water (100 ml.) and the volatile products, combined with those which had passed through the reflux condenser and been condensed in a trap cooled by liquid oxygen, were transferred to a vacuum system. Distillation gave the new compound 1-H-2-trifluoromethyl-1,2,3,3,4,4,-hexafluorocyclobutane (79%), B.P. 36° (isoteniscope). (Found: C, 25.6; H, 0.4%; M, 231. $C_5HF_9$ requires C, 25.9; H, 0.4%, M, 232).

This new compound is useful as a propellant in aerosol bombs, as a refrigerant, and as an insulating gas for high voltage apparatus, such as generators or motors.

(c) 1-H-2-trifluoromethyl-1,2,3,3,4,4-hexafluorocyclobutane (3.7 g.) was shaken with powdered potassium hydroxide (4 g.) and water (4 ml.) for 5 hours. Distillation of the volatile products in vacuo gave the new compound 2-trifluoromethyl-1,3,3,4,4-pentafluorocyclobutene-1 (83%), B.P. 24° (isoteniscope). (Found: C, 28.3%; M, 212. $C_5F_8$ requires C, 28.3%; M, 212).

The new compound is useful as a propellant for aerosols. It may also be polymerized and copolymerized, for example, with vinyl ethers, to give higher molecular weight liquids or solids which are useful as lubricants and plastics. It is also an intermediate for the production of tetrafluorosuccinic acid, which has been used to give temperature-stable polyester resins.

(d) 2-trifluoromethyl-1,3,3,4,4-pentafluorocyclobutene-1 (1.1 g.), mixed with chlorine (0.5 g.) and exposed to ultraviolet light (24 hours) gave the new compound 1,2-dichloro - 2 - trifluoromethyl -1,3,3,4,4 - pentafluorocyclobutane (91%) B.P. 80° (isoteniscope). (Found: C, 21.1%; M, 283. $C_5Cl_2F_8$ requires C, 21.2%; M, 283).

(e) 2-trifluoromethyl-1,3,3,4,4-pentafluorocyclobutene (2.7 g.), potassium permanganate (2 g.), water (15 ml.), and potassium hydroxide (2.1 g.) were shaken vigorously in an autoclave and heated to 75° (8 hours). The excess of permanganate was removed, and the acid produced was isolated by ether extraction in the usual way. The solid remaining after evaporation of the ether was perfluorosuccinic acid (69%) identified by conversion into its disodium salt; the infra-red spectrum of the last compound was compared with that of a known specimen.

Perfluorosuccinic acid was also isolated (61%) by reaction of 2-trifluoromethyl-1,2,3,3,4,4-hexafluorocyclobutane (3.0 g.) with permanganate under the above conditions. Fluoroform was also detected as a reaction product by means of its infra-red spectrum.

*Example II*

(a) Perfluorocyclohexene (4.2 g.) and trifluoroiodomethane (100% excess) were exposed to intense ultraviolet radiation from a Hanovia lamp 2 cm. from the silica reaction tube. Even with this vigorous treatment and a temperature of 60–65°, the reaction was very slow, and after 24 days 70% of the olefin was recovered unchanged. The material with B.P. 60° was removed and the unreacted trifluoroiodomethane and perfluorocyclohexene were again irradiated (3 weeks). Distillation of the combined products gave unchanged olefin (44%), the new compound 1 - iodo - 2 -trifluoromethyldecafluorocyclohexane (68% based on olefin used) B.P. 132° (micro). Found: C, 18.3%; M, 455. $C_7IF_{13}$ requires C, 18.3%; M, 458), and perfluoro-1,2-dimethylcyclohexane (11% based on olefin used), B.P. 101–102°. (Found: C, 24.0%; M, 400. Calc. for $C_8F_{16}$: C, 24.0%; M, 400).

The new compound is useful in float instruments and manometers and in the separation of solids by flotation methods. It is also fungicidal.

(b) To a stirred solution of lithium aluminium hydride (1.0 g.) in dry ether (20 ml.) was slowly added (2 hours) 1 -iodo - 2 -trifluoromethyldecafluorocyclohexane (4.1 g.) in dry ether (10 ml.). After being kept (1 hour) and heated under reflux (1 hour) the excess of lithium aluminium hydride was destroyed by cautious addition of 25% sulphuric acid (10 ml.), followed by water (30 ml.). The dried ethereal layer and extracts of the aqueous solution were distilled to give the new compound 1-H-2-trifluoromethyldecafluorocyclohexane (62%) B.P. 86° (isoteniscope). (Found: C, 25.2; H, 0.3%; M, 332).

This compound is useful as a liquid dielectric, as a solvent for fluoro greases and polymers. It may also be used as a heat transfer medium and its high coefficient of thermal expansion makes it useful in instrumentation as a substitute for mercury, where a non-conducting highly stable liquid is required.

(c) A mixture of 1-H-2-trifluoromethyldecafluorocyclohexane (3.1 g.), potassium hydroxide (1.5 g.) and water (3 ml.) was heated in a sealed tube at 85° for 3 hours. Water was added, and the organic layer was separated and distilled from phosphoric anhydride to give the new compound 2 - trifluoromethylnonafluorocyclohexene (78%), B.P. 75°. (Found: C, 26.8%; M, 310. $C_7F_{12}$ requires C, 26.9; M, 312).

The new compound can be polymerized and copolymerized with compounds such, for example, as vinyl ethers to give oils, greases and waxes. It can be polymerized with halogenated olefins such as tetrafluoroethylene or chlorotrifluoroethylene to give oils and solids having lubricating and plastic properties. It may also be used as an intermediate in the formation of perfluoroadipic acid, which in turn yields temperature-stable polyesters.

(d) 2-trifluoromethylnonafluorcyclohexene (1.2 g.), potassium permanganate (4 g.), and water (15 ml.) were heated and shaken at 80° (15 hours) in a sealed tube. Removal of the excess of permanganate with sulphur dioxide and ether extraction in the known manner, followed by distillation of the dried Na₂SO₄ ethereal extracts gave a residual white solid which was dried over phosphoric anhydride. A portion of the solid had M.P. 133° after sublimation in vacuo. The rest of the solid was exactly neutralized by aqueous sodium hydroxide and the aqueous solution was freeze-dried to give disodium perfluoroadipate (75% total yield) identified by means of its infrared spectrum.

(e) 1-H-2-trifluoromethyldecafluorocyclohexane (2.1 g.) was sealed in a silica tube with water (2 ml.) and a 10% excess of chlorine and irradiated for 48 hours. Distillation of the dried P₂O₅ organic layer gave the new compound 1-chloro-2-trifluoromethyldecafluorocyclohexane (78%), B.P. 103° (Found: C, 22.8%; M, 365. C₇ClF₁₃ requires C, 22.9%; M, 366.5), and unchanged starting material (5%).

The same chloro compound was produced in 85% yield by reaction of 1-iodo-2-trifluoromethyldecafluorocyclohexane (1.5 g) with chlorine (30% excess) in a sealed tube on exposure to ultra-violet light (3 days). The iodo compound (2.7 g.) and 20% excess of bromine kept in the dark (2 days) then irradiated (2 days) gave 1-bromo-2-trifluoromethyldecafluorocyclohexane (78%), B.P. 115° (Found: C, 20.4%; M, 407. C₇BrF₁₃ requires C, 20.4; M, 411).

These new compounds are useful as liquid dielectrics, and as heat transfer media, for example in atomic piles. They are solvents for fluoro greases and polymers, and their high densities make them useful in float instruments and manometers.

(f) 2-trifluoromethylnonafluorocyclohexene (1.0 g.) and chlorine (10% excess) strongly irradiated in a 10 ml. silica tube at 80° (4 days) gave the new compound 1,2-dichloro-2-trifluoromethylnonafluorocyclohexane (65%) B.P. 130° (micro) (Found: C, 21.9%. C₇Cl₂F₁₂ requires C, 21.9%), and unchanged olefin (15%).

Similar reaction with bromine for 7 days gave 1,2-dibromo-2-trifluoromethylnonafluorocyclohexane (57%), B.P. 160° (Found: C, 17.8%. C₇Br₂F₁₂ requires C, 17.8%), and recovered olefin (28%).

These new compounds have many of the applications of 1-chloro-2-trifluoromethyldecafluorocyclohexane and its 1-bromo-analog, previously described. In addition, they are non-flammable hydraulic fluids and can be used as special lubricants under conditions of heavy corrosion, or where flammability must be avoided. They may also be used as insulating fluids, sealing fluids, and extractants.

What I claim is:
1. Organic fluorine compounds having the general formula

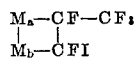

where $M_a$ and $M_b$ are $-(CF_2)_n-$ radicals, where $n$ is an integer from 1 to 2.

2. 1-iodo-2-trifluoromethyl-hexafluorocyclobutane.
3. 1-iodo-2-trifluoromethyl-decafluorocyclohexane.
4. A method of making organic fluorine compounds having the general formula

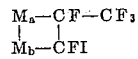

where $M_a$ and $M_b$ are $-(CF_2)_n-$ redicals where $n$ is an integer from 1 to 2, which comprises reacting a cyclic olefin having the general formula

where $M_a$ and $M_b$ are as defined above with $CF_3I$, under conditions conducive to free radical formation.

5. A method of making an organic fluorine compound having the formula

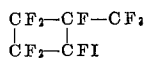

which comprises reacting perfluorocyclobutene and trifluoroiodomethane, under conditions conducive to free radical formation.

6. A method of making an organic fluorine compound having the formula

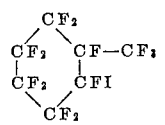

which comprises reacting $CF_3I$ with perfluorocyclohexene.

References Cited in the file of this patent
UNITED STATES PATENTS

| | | |
|---|---|---|
| 2,436,142 | Harmon | Feb. 17, 1948 |
| 2,462,654 | McBee et al. | Feb. 22, 1949 |
| 2,509,155 | Ligett et al. | May 23, 1950 |
| 2,614,131 | Simons et al. | Oct. 14, 1952 |
| 2,654,789 | Ligett | Oct. 6, 1953 |

OTHER REFERENCES

Henne et al: "Jour. Am. Chem. Soc.," vol. 73 pp. 1791–2 (1951).

Barlow et al.: Jour. Chem. Soc., London (1955), pp. 1749–52.

UNITED STATES PATENT OFFICE
CERTIFICATION OF CORRECTION

Patent No. 2,992,279                                  July 11, 1961

Robert Neville Haszeldine

It is hereby certified that error appears in the above numbered patent requiring correction and that the said Letters Patent should read as corrected below.

Column 2, lines 30 and 31, formula (e) should appear as shown below instead of as in the patent:

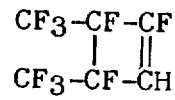

lines 34 and 35, formula (f) should appear as shown below instead of as in the patent:

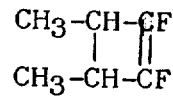

same column 2, lines 38 to 43, formula (g) should appear as shown below instead of as in the patent:

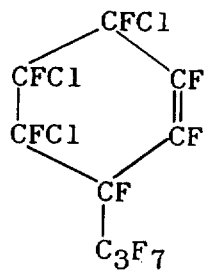

column 3, line 73, for "iodie" read -- iodine --; column 6, line 37, for "Found:" read -- (Found: --; column 7, line 4, for "2-trifluoromethylnonaflurorcyclohexene" read -- 2-trifluoromethylnonafluorocyclohexene --; column 8, line 16, for "redicals" read -- radicals --.

Signed and sealed this 28th day of November 1961.

(SEAL)
Attest:

ERNEST W. SWIDER                                     DAVID L. LADD
Attesting Officer                                     Commissioner of Patents